United States Patent [19]

Okazaki

[11] 4,107,021
[45] Aug. 15, 1978

[54] WATER POT WITH AN ELECTROLYZING DEVICE

[75] Inventor: Tatsuo Okazaki, Kamifukuoka, Japan

[73] Assignee: Okazaki Manufacturing Company Ltd., Kawagoe, Japan

[21] Appl. No.: 744,706

[22] Filed: Nov. 24, 1976

[51] Int. Cl.² .............. C25B 11/00; C25B 13/00; C25B 15/00

[52] U.S. Cl. .................... 204/263; 204/260; 204/271

[58] Field of Search ............... 204/271, 263, 260, 253

[56] References Cited

U.S. PATENT DOCUMENTS

| 649,614 | 5/1900 | Peyrusson | 204/263 |
|---|---|---|---|
| 1,544,052 | 6/1925 | Avary | 204/271 |
| 1,842,296 | 1/1932 | Statham et al. | 204/260 |
| 1,966,102 | 7/1934 | Muller | 204/260 |
| 3,623,969 | 11/1971 | Hushihara | 204/271 |
| 3,972,794 | 8/1976 | Lamm | 204/266 |

Primary Examiner—F.C. Edmundson
Attorney, Agent, or Firm—Flynn & Frishauf

[57] ABSTRACT

A water pot with an electrolyzing device comprises a pot body having an opening at the top thereof and a handle, the pot body including an electrolyzing vessel divided into two chambers by a porous partition formed into a hollow shape, the chambers having therein negative and positive electrodes respectively, means for removing the water from the positive electrode chamber after an electrolyzing operation, a cover detachably mountable on said opening at the top of the pot body, said opening being adapted to supply water to the vessel and said hollow porous partition being adapted to be inserted into the vessel and removed therefrom through said opening. A nozzle is formed in the cover or in the remaining portion of the pot body so as to communicate with the negative electrode chamber.

31 Claims, 14 Drawing Figures

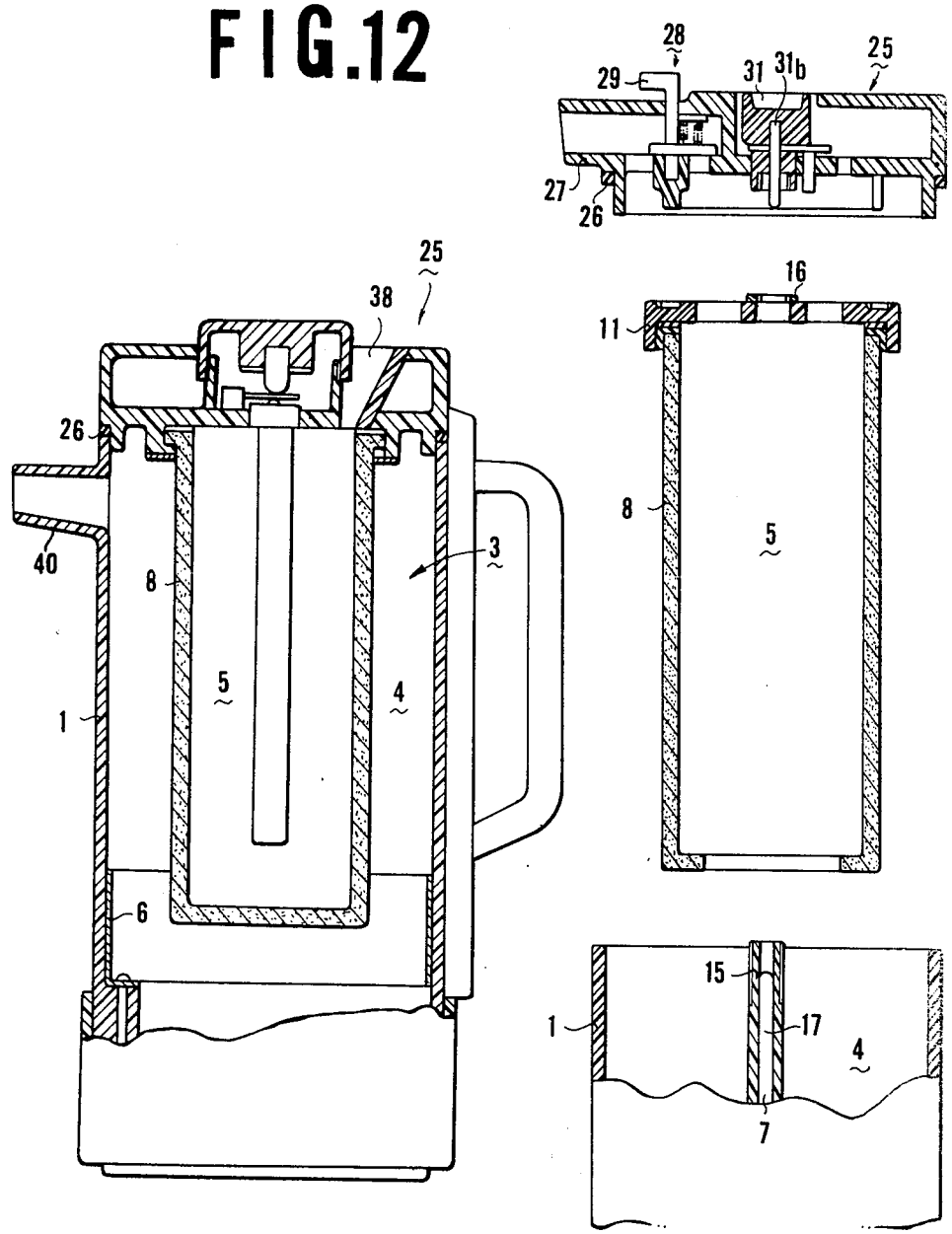

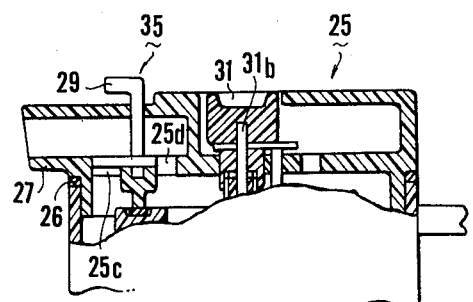
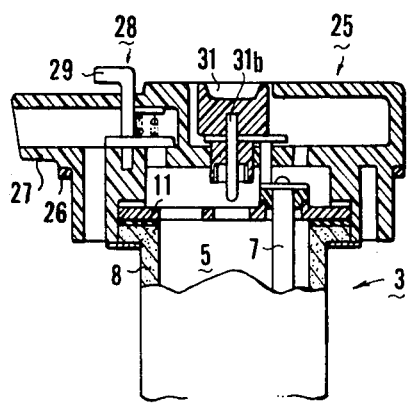
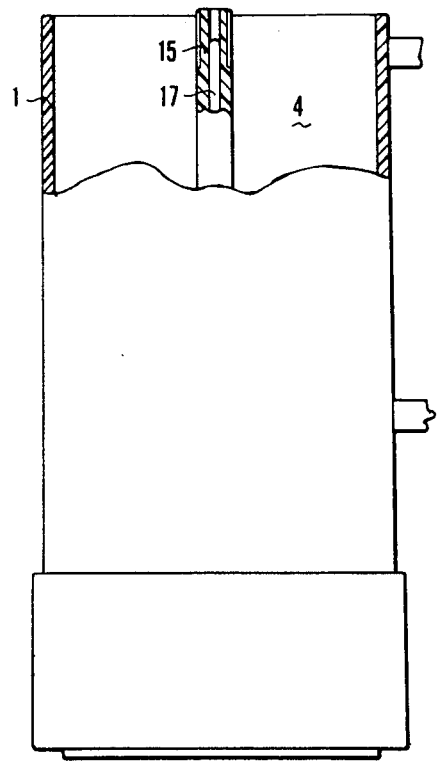
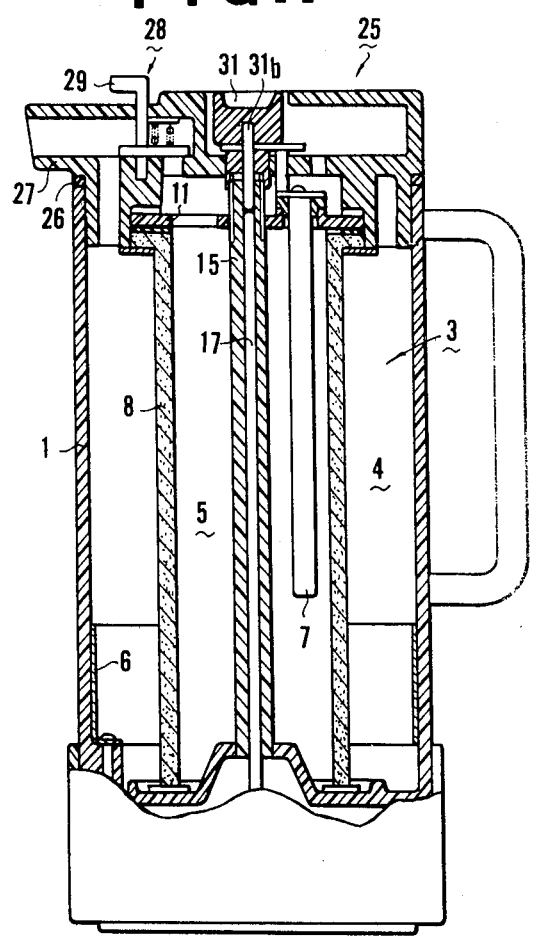

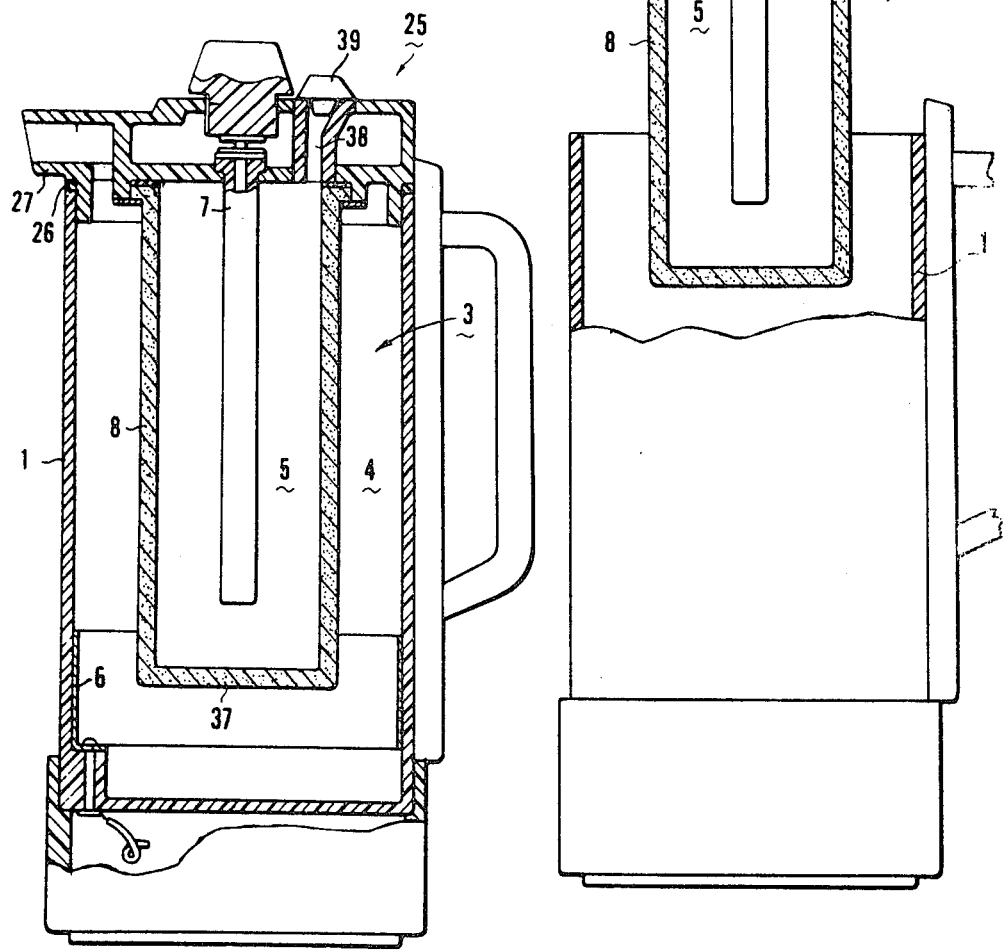

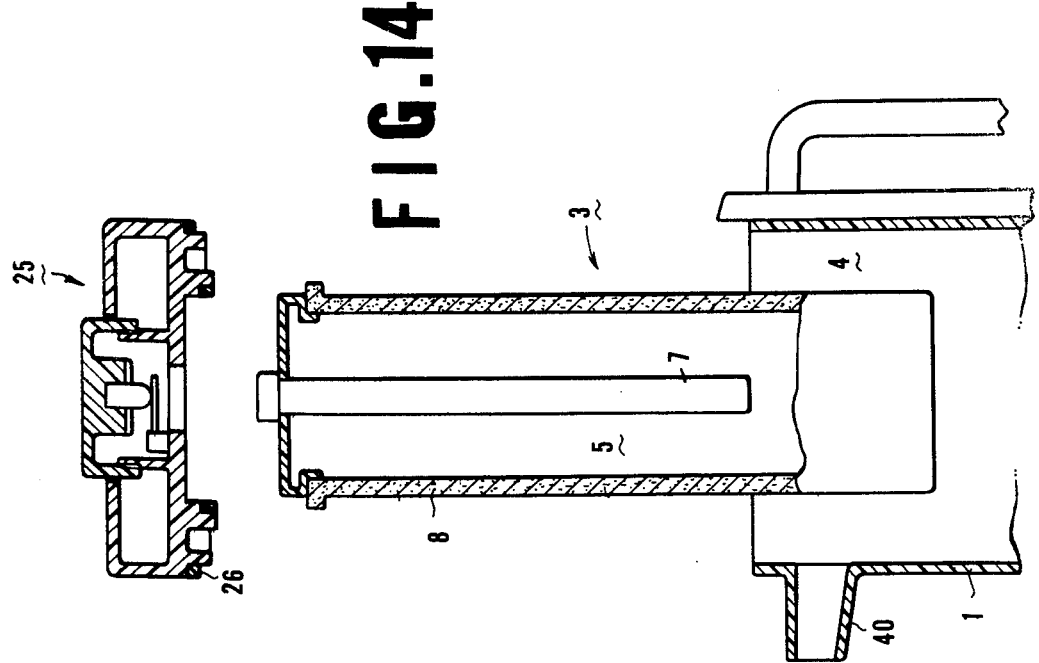
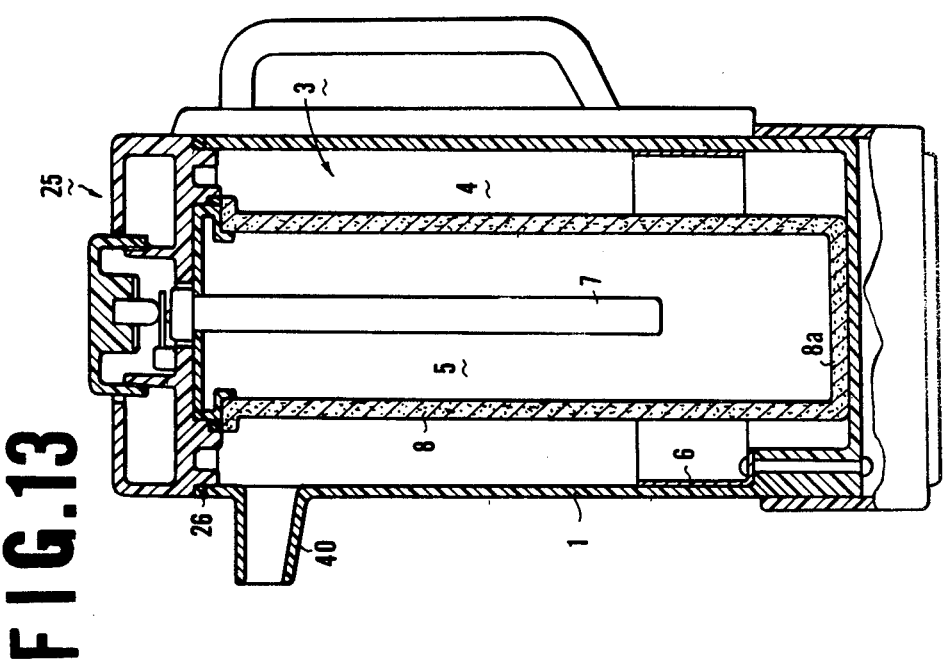

WATER POT WITH AN ELECTROLYZING DEVICE

The present invention relates to a water pot with an electrolyzing device which includes an electrolyzing vessel divided into two chambers by a porous partition, the chambers having therein negative and positive electrodes, respectively.

Generally, a water electrolyzing device needs to use a separate water pot in order to store ionized water after an electrolyzing operation, whereby the handling of the device from the start of the electrolyzing operation until the pouring out of the ionized water to a cup is very complicated and troublesome.

The present inventor has proposed a combination of a water pot and water electrolyzing device for use as a negative chamber and also as a storage tank or pot after electrolysis.

In this case, there is a problem that there is apt to occur ion drift between negative and positive electrode chambers after electrolysis so that a balance condition may arise which is the same as the ionization in the original water before the electrolysis.

SUMMARY OF THE INVENTION

An object of this invention is to provide a water pot with an electrolyzing device which is so improved as to maintain drinking water in a desired ionization state during storage with the aid of only a slight handling operation and to pour the drinking water with ease, for example into a general water pot.

In the present invention, the water pot with the electrolyzing device includes a pouring nozzle communicating with a negative electrode chamber and means adapted to remove the water from a positive electrode chamber after electrolysis, for example with the aid of a simple manual operation.

The means for removing water from the positive electrode chamber may be an assembly including a valve disposed between the pouring nozzle and the negative electrode chamber, and a communication path adapted to permit water flow between the pouring nozzle and the positive electrode chamber.

The means for removing water from the positive electrode chamber may be an assembly including a changing valve such as a three way valve disposed in the pouring nozzle so as to alternatively communicate the pouring nozzle with either one of the chambers.

The means for removing water from the positive electrode chamber may alternatively include a hollow cylindrical partition with a closed bottom which is detachably disposed in the interior of vessel, so that the water in the positive electrode chamber is removed when the partition is taken out from the vessel.

BRIEF DESCRIPTION OF THE DRAWINGS

FIG. 4 is a vertical cross-section of the pot of FIGS. 1-3 which is partly demounted at washing time;

FIG. 6 is a vertical cross-section of a part of a pot with an electrolyzing device modified from that of FIGS. 1 to 4;

FIG. 7 is a vertical cross-section of another type of a pot with an electrolyzing device embodying the present invention;

FIG. 8 is a vertical cross-section of the pot of FIG. 7 which is partly demounted in general use;

FIG. 9 is a vertical cross-section of a part of a pot with an electrolyzing device modified from that of FIGS. 7 and 8;

FIG. 10 is a vertical cross-section of still another type of a pot with an electrolyzing device embodying the present invention;

FIG. 11 is a vertical cross-section of the pot of FIG. 10 which is partly demounted;

FIG. 12 is a vertical cross-section of a part of a pot with an electrolyzing device modified from that of FIGS. 10 and 11;

FIG. 13 is a vertical cross-section of yet another type of a pot with an electrolyzing device embodying the present invention; and FIG. 14 is a vertical cross-section of the pot of FIG. 13 which is partly demounted.

DETAILED DESCRIPTION

Figure 3:
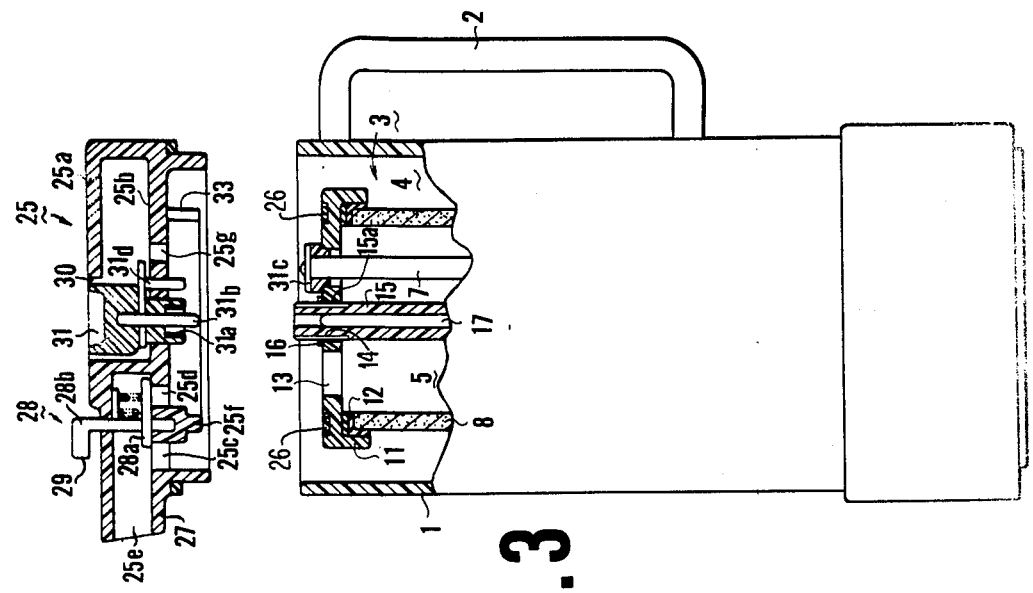
FIG. 3 is a vertical cross-section of the pot of FIGS. 1 and 2 which is partly demounted in general use.
Figure 1:
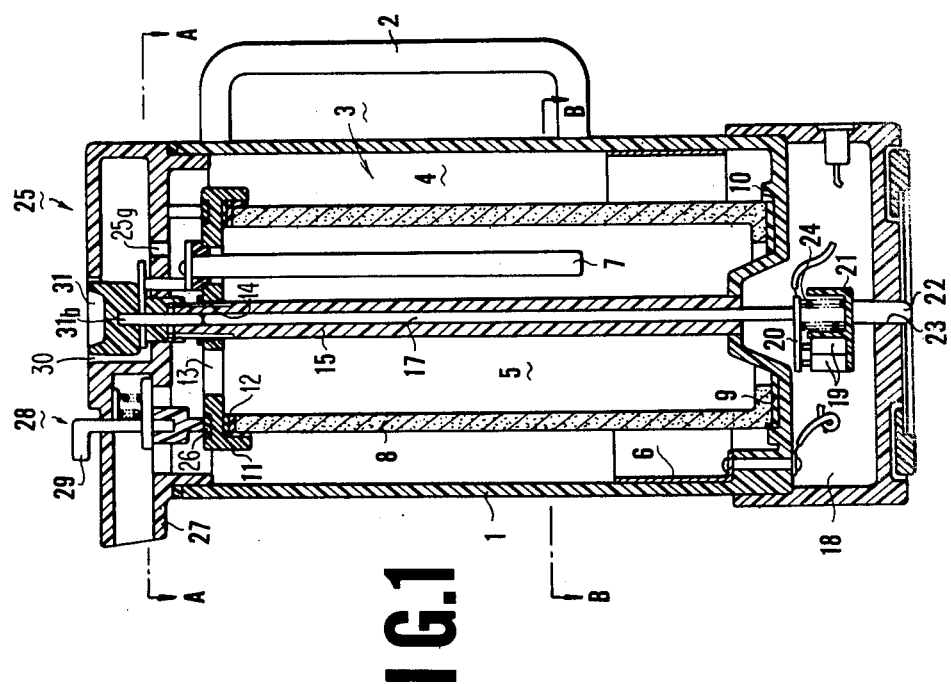
FIG. 1 is a vertical cross-section of a pot with an electrolyzing device embodying the present invention.

Referring to FIGS. 1 to 4, there is shown a pot with an electrolyzing device embodying this invention. The assembly comprises a pot body 1 with a handle 2 made of hard plastic resin such as ABS resin. The pot body 1 includes an electrolyzing vessel 3 divided into two chambers 4 and 5 having negative and positive electrodes 6 and 7 respectively, by a porous partition 8 formed into a hollow shape, so that the negative electrode chamber 4 is situated outside of the partition 8 and the positive electrode chamber 5 inside of the partition 8. Said porous partition may be made of unglazed pottery material. Said negative electrode 6 may be made of stainless steel and said positive electrode of carbon black.

In the embodiment of FIGS. 1-4, the negative electrode is a plate curved along the inner wall of the vessel, and the positive electrode is a pole or rod-shaped element.

The partition 8 can be inserted into the vessel 3 through a large diameter opening formed in the top of the pot body 1 in a manner so as to be detachably set on the bottom of the vessel 3 in waterproof manner by means of an annular bottom packing 9. Namely, the bottom packing 9 is attached to the bottom of the vessel 3 surrounding an annular protrusion 10 formed on the vessel bottom so as to fit tightly to the bottom edge of the partition 8 when the partition 8 is set on the vessel bottom.

To the top of the partition 8 is detachably attached a holding member 11 with an annular packing 12 inserted between them. Said holding member 11 is adapted to hang the positive electrode 7 in the chamber 5.

Said holding member 11 may be made of a plastic plate which has a through bore 13 therein for passing the water and a guide aperture 14 through which upwardly penetrates a hollow pillar or rod 15 which extends upwardly from the vessel bottom.

As best shown in FIG. 3, the pillar 15 has a screw threaded portion 15a at its top, so that a nut 16 may be detachably screwed thereto to fix the partition 8 to the vessel in a static condition.

A lead pole 17 is slidably inserted into the pillar 15 in a vertical orientation.

The pot body 1 further includes a control chamber 18 at the bottom portion thereof which is separated from the electrolyzing vessel 3 in a water proof manner. In the control chamber 18 is disposed safety switches 19 having switching buttons opposite to a pusher 20 attached to the lower end of the lead pole 17. Said switches 19 are supported on a movable member 21 having a slide pin 22 which penetrates an aperture 23 formed in the bottom of the control chamber 18. Between the pusher 20 and member 21 is disposed a compression spring member 24 which biases the pusher 20 upwards and the member 21 downwards.

Accordingly, when the lead pole 17 is downwardly depressed, the pusher 20 acts to close the safety switches 19. When the slide pin 23 is downwardly pushed due to, for example the pot body turning upside down, the safety switches 19 disengage from the pusher 20 and are changed to an open state rendering the pot inoperative.

The pot with the electrolyzing device in accordance with this invention further comprises a removable lid or cover 25 which includes, as best seen in FIG. 3, an outer lid 25a, an inner wall 25b, two paths 25c and 25d and a pouring outlet port 25e formed in a nozzle 27 protruding from one side of the cover 25. Said cover 25 is detachably set on the upper opening of the pot body 1, so that when the cover 25 is completely set on the opening of the pot body 1, an annular packing 26 surrounding and attached to the top edge of the holding member 11 tightly contacts an annular protrusion 25f formed in the bottom wall of the cover 25. Said path 25c communicates with the negative electrode chamber 4 and the other path 25d with the positive electrode chamber 5. Both paths 25c and 25d alternatively communicate with said nozzle 27 via a three-way valve 28.

Figure 2:
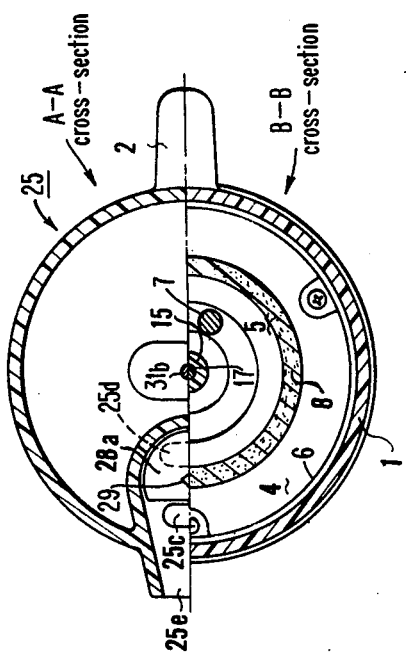
FIG. 2 is a horizontal cross-section of the pot, half illustrated along a line A—A of FIG. 1, and the remaining half illustrated along a line B—B of FIG. 1.

As best seen in FIGS. 2 and 3, the three-way valve 28 comprises a sector valve plate 28a attached to a control shaft 28b turnably supported to the body of the cover 25. Said sector plate 28a is adapted to close either one of the paths 25c and 25d, and open the remaining one alternatively. Said shaft 28b penetrates the upper portion of the cover 25 to project outside and has a manual operation handle 29.

An aperture 30 is formed in the central portion of the outer lid 25a and a clamping cap 31 is located in the interior of the cover 25 in a manner to face to the aperture 30. Said clamping cap 31 is supported in a manner to turn relative to the body of the cover 25, but not to move in a vertical direction. Said clamping cap 31 includes in internally screw threaded portion 31a (FIG. 3) which is detachably screwed to the screw threaded portion 15a of the pillar 15 when the clamping cap 31 is manually turned relative to the pillar 15, a contact lead member 31b which electrically contacts the top of the lead pole 17 when the screw 31a is screwed to the screw 15a, and a lead pole 31d connected to the contact lead 31b and adapted to electrically contact a terminal 31c mounted on the top end of the positive electrode 7.

In this embodiment, the annular protrusion 25f may have an overflow groove 33 so as to guide water from the negative electrode chamber 4 to the positive electrode chamber 5 when the water level in the former 4 rises over a prescribed level (an overflow line), thereby to avoid overflowing at the outlet port 25e.

In order to provide an air duct or vent, the cover 25 has a bore 25g formed in the inner wall.

Figure 5:
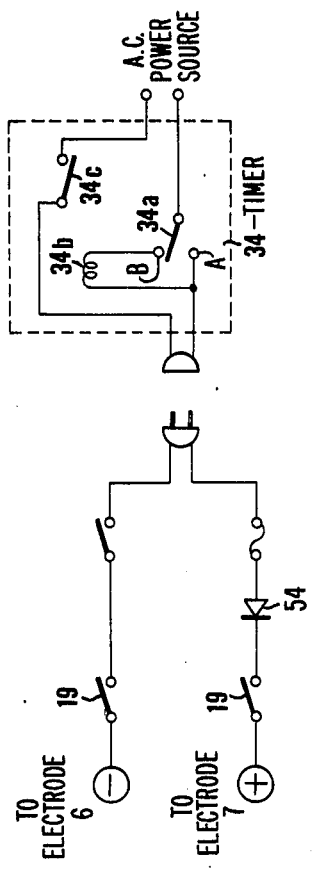
FIG. 5 is a circuit for use with the electrolyzing device of FIGS. 1-4.

Referring to FIG. 5, a circuit conversion of A.C. to D.C. for use in the pot embodying the present invention includes a rectifier such as a diode 54. Said circuit further includes a timer 34, which may be located in the pot body 1 (i.e., in the control chamber 18) and the safety switches 19 already mentioned.

In this embodiment, the timer 34 includes a changeover timer switch 34a, a call buzzer 34b and a set switch 34c.

In operation, the clamping cap 31 is operated so as to release its screw 31a from the pillar or rod 15, and the cover 25 is removed from the pot body 1 so that the natural water may be poured through the opening to both the chambers 4 and 5. Then, said cover 25 is attached to the pot body 1 by inserting the cover 25 into the opening and rotating the clamping cap 31 to threadably engage the screw 31a with the screw 15a to tightly seal the bottom of portion 25f of the cover 25 against the packing 26.

When the timer 34 is set on by setting switch 34a at position A and closing its set switch 34c, the direct current is applied to the electrodes 6 and 7. If the safety switches 19 are closed, the water electrolyzing and electro-omosis start and are maintained until the time 34 times out, at which time its switch 34a switches to position B. Thereby, the buzzer 34b is energized to call the operator.

After electro-treatment, by operation of the handle 29, the valve 28 is turned so as to open the path 25d and close the path 25c, and then by inclination of the pot body, the water containing anion particles in the positive electrode chamber 5 is taken out through the outlet port 25e. The negative electrode chamber 4 is available to reserve the water containing cation particles without mixing with the anionized water.

By the valve 28 being set to open the path 25c, the reserved water is used through the outlet port 25e in the same manner as that of a prior pot having no electrolyzing device.

When the pot body 1 is turned upside down or the cover 25 is removed by misoperation during the water-electrolyzing process, the pin 22 is moved downwards by the spring member 24 or the lead pole 17 is moved upwards by the spring member 24 due to the contact member 31b left out from the top of the lead pole 17, so that the safety switches 19 are opened.

If the water in the negative electrode chamber 4 rises above the prescribed level due to the water electro-omosis, the upper part of the water body overflows through the groove 33 to the positive electrode chamber 5.

In order to wash the interior of the vessel 3, the nut 16 is disengaged from the screw 15a, so that the holding member 11 together with the partition 8 is free from the vessel 3 and is removed therefrom.

Instead of the three-way valve 28, an on-off valve 35 may be provided which is connected only to the path 25c as shown in FIG. 6. In this case, after electro-treatment, the water in the positive electrode chamber can be taken out under the closed condition of the valve 35, so that only the water in the negative electrode chamber 4 is reserved.

FIGS. 7 and 8 illustrate another embodiment of this invention, wherein the top of the partition 8 is fixed to the bottom of the cover 25 and the partition 8 is lifted out simultaneously when the cover 25 is removed.

Accordingly, the natural water can be poured into the vessel 3 having no partition, and separated into two areas by the partition 8 when the cover is set on the opening.

In this case, the partition 8 may have a bottom wall 8a including a guide hole 8b as shown in FIG. 9. An annular packing 36 is provided instead of the packing 9 to be attached to the inside brim of the bottom wall 8a surrounding the hole 8b and then to be tightly fitted to the neck of the pillar 15. Since the packing 36 has a small diameter, the adequate sealing between the bottom of the partition 8 and the bottom of the vessel 3 is accomplished regardless of setting condition of the cover to the opening of the pot body 1.

FIGS. 10 and 11 illustrate another embodiment of this invention, wherein the partition 8 has a closed bottom wall 37 and the cover 25 has a pouring inlet port 38 with a lid cap 39 only for the positive electrode chamber 5 already separated from the negative electrode chamber 4 by the partition 8. An electric lead mechanism for the positive electrode 7 can be adapted to lead the current through the interior of the wall of the pot body 1.

In the embodiment of FIGS. 10 and 11, by removing the cover 25 together with the partition 8, the opened pot body 1 can be used as a drinking cup.

Furthermore, the embodiment of FIGS. 10 and 11 may be modified as shown in FIG. 12, wherein the cover 25 has no nozzle. A pouring nozzle 40 is formed in the pot body 1 only for the water in the negative electrode chamber 4. In this case, after the electro-treatment, the water in the positive electrode chamber 5 is separately removed by a manual operation, such as by lifting the cover 25 together with the partition 8 out from the pot body 1. The water is then taken out through the port 38.

FIGS. 13 and 14 illustrate a further embodiment of this invention wherein the pot with the electrolyzing device is essentially of the same construction as that of the first embodiment except that the partition 8 has a closed bottom wall 8a.

In the embodiment of FIGS. 13 and 14, the electric lead mechanism should be similar to that of FIGS. 10 and 11. The cover 25 may be pivoted to the upper edge of the pot body 1 and the electric control mechanism may be disposed in a space which may be formed in the handle 2.

What is claimed is:

1. A water pot with an electrolyzing device comprising a pot body having an opening at the top thereof to receive water to be electrolyzed, and a handle, said pot body including:
    an electrolyzing vessel, said vessel having support areas for supporting a partition therein;
    a removable hollow, porous partition member which is mountable on said support areas of said vessel for dividing said vessel into two chambers, said hollow porous partition member being insertable into said vessel through said opening and being mountable in said vessel in water proof relationship to said vessel at said support areas;
    a negative electrode in one of said chambers and a positive electrode in the other of said chambers;
    means in communication with the positive electrode chamber for removing water from said positive electrode chamber after an electrolyzing operation;
    a cover detachably mounted on said opening at the top of said pot body, said cover including two flow paths communicating respectively with said negative electrode chamber and said positive electrode chamber;
    a nozzle in said pot body which is in communication with said negative electrode chamber; and
    said means for removing water from said positive electrode chamber comprising a three way valve for selectively communicating said two flow paths with said nozzle.

2. A water pot with an electrolyzing device according to claim 1 wherein said three way valve includes an operating handle protruding from said cover.

3. A water pot with an electrolyzing device according to claim 1 wherein said partition member is detachably connected to the bottom of said cover.

4. A water pot with an electrolyzing device according to claim 1 wherein said partition member and cover include water proof coupling means for separating said negative electrode chamber and positive electrode chamber in a water proof manner at said coupling means when said cover is set on said top opening of said pot body.

5. A water pot with an electrolyzing device according to claim 1 further comprising a holding member for releasably retaining said partition detachably and in a static condition in the interior of said vessel.

6. A water pot with an electrolyzing device according to claim 1 wherein said partition member has a closed bottom and is detachably connected to the bottom of said cover.

7. A water pot with an electrolyzing device according to claim 1 wherein said means for removing water from said protective electrode chamber comprises a manually operable means.

8. A water pot with an electrolyzing device according to claim 1 wherein said nozzle is formed in said cover of said pot body.

9. A water pot with an electrolyzing device according to claim 1 wherein said nozzle is formed in said electrolyzing vessel.

10. A water pot with an electrolyzing device according to claim 1 wherein said partition member has an aperture in the bottom thereof, and further comprising a hollow pillar protruding from the bottom of said vessel and extending upwards through said aperture in the bottom of said partition member, said cover including a screw which is detachably screwed to the top of said pillar so as to fix said cover to said pillar, thereby fixedly covering said opening of said pot body.

11. A water pot with an electrolyzing device comprising a pot body having an opening at the top thereof to receive water to be electrolyzed, and a handle, said pot body including:
    an electrolyzing vessel, said vessel having support areas for supporting a partition therein;
    a removable hollow, porous partition member which is mountable on said support areas of said vessel for dividing said vessel into two chambers, said hollow porous partition member being insertable into said vessel through said opening and being mountable in said vessel in water proof relationship to said vessel at said support areas;
    a negative electrode in one of said chambers and a positive electrode in the other of said chambers;
    means in communication with the positive electrode chamber for removing water from said positive electrode chamber after an electrolyzing operation;
    a cover detachably mounted on said opening at the top of said pot body, said cover including two flow paths communicating respectively with said negative electrode chamber and said positive electrode chamber;

a nozzle in said pot body which is in communication with said negative electrode chamber; and said means for removing water from said positive electrode chamber comprising a two way valve disposed in said flow path wich communicates with said negative electrode chamber and which is controllable alternatively in either one of open and closed conditions.

12. A water pot with an electrolyzing device according to claim 11 wherein said two way valve includes an operating handle protruding from said cover.

13. A water pot with an electrolyzing device according to claim 11 wherein said partition and cover include water proof coupling means for separating said negative electrode chamber and positive electrode chamber in a water proof manner at said coupling means when said cover is set on said top opening of said pot body.

14. A water pot with an electrolyzing device according to claim 11 further comprising a holding member for releasably retaining said partition detachably and in a static condition in the interior of said vessel.

15. A water pot with an electrolyzing device according to claim 11 wherein said partition member has a closed bottom and is detachably connected to the bottom of said cover.

16. A water pot with an electrolyzing device according to claim 11 wherein said means for removing water from said positive electrode chamber comprises a manually operable means.

17. A water pot with an electrolyzing device according to claim 11 wherein said nozzle is formed in said cover of said pot body.

18. A water pot with an electrolyzing device according to claim 11 wherein said nozzle is formed in said electrolyzing vessel.

19. A water pot with an electrolyzing device according to claim 11 wherein said partition member has an aperture in the bottom thereof, and further comprising a hollow pillar protruding from the bottom of said vessel and extending upwards through said aperture in the bottom of said partition member, said cover including a screw which is detachably screwed to the top of said pillar so as to fix said cover to said pillar, thereby fixedly covering said opening of said pot body.

20. A water pot with an electrolyzing device comprising a pot body having an opening at the top thereof to receive water to be electrolyzed, and a handle, said pot body including:

an electrolyzing vessel, said vessel having support areas at the bottom thereof for supporting a partition therein;

a removable hollow, porous partition member which is mountable on said support areas of said vessel for dividing said vessel into two chambers, said hollow porous partition member being insertable into said vessel through said opening and being mountable in said vessel in water proof relationship to said vessel at said support areas;

packing means for coupling said partition member to said support areas at the bottom of said vessel in said water proof manner;

a negative electrode in one of said chambers and a positive electrode in the other of said chambers;

means in communication with the positive electrode chamber for removing water from said positive electrode chamber after an electrolyzing operation;

a cover detachably mounted on said opening at the top of said pot body;

said partition member and cover including water proof coupling means for separating said negative electrode chamber and positive electrode chamber in a water proof manner at said water proof coupling means when said cover is set on said top opening of said pot body; and a nozzle in said pot body which is in communication with said negative electrode chamber.

21. A water pot with an electrolyzing device according to claim 18 further comprising a holding member for releasably retaining said partition detachably and in a static condition in the interior of said vessel.

22. A water pot with an electrolyzing device according to claim 20 wherein said cover includes two flow paths communicating respectively with said negative electrode chamber and said positive electrode chamber; and said means for removing water from said positive electrode chamber comprises a three way valve for selectively communicating said two flow paths with said nozzle.

23. A water pot with an electrolyzing device according to claim 20 wherein said cover includes two flow paths communicating respectively with said negative electrode chamber and said positive electrode chamber; and said means for removing water from said positive electrode chamber comprises a two way valve disposed in said flow path which communicates with said negative electrode chamber and which is controllable alternatively in either one of open and closed conditions.

24. A water pot with an electrolyzing device according to claim 20 wherein said partition member has an aperture in the bottom thereof, and further comprising a hollow pillar protruding from the bottom of said vessel and extending upwards through said aperture in the bottom of said partition member, said cover including a screw which is detachably screwed to the top of said pillar so as to fix said cover to said pillar, thereby fixedly covering said opening of said pot body.

25. A water pot with an electrolyzing device comprising a pot body having an opening at the top thereof to receive water to be electrolyzed, and a handle, said pot body including:

an electrolyzing vessel, said vessel having support areas for supporting a partition therein;

a removable hollow, porous partition member which is mountable on said support areas of said vessel for dividing said vessel into two chambers, said hollow porous partition member being insertable into said vessel through said opening and being mountable in said vessel in water proof relationship to said vessel at said support areas;

a negative electrode in one of said chambers and a positive electrode in the other of said chambers;

means in communication with the positive electrode chamber for removing water from said positive electrode chamber after an electrolyzing operation;

a cover detachably mounted on said opening at the top of said pot body;

said partition member having a closed bottom and being detachably connected to the bottom of said cover; and a nozzle in said pot body which is in communication with said negative electrode chamber.

26. A water pot with an electrolyzing device comprising a pot body having an opening at the top thereof to receive water to be electrolyzed, and a handle, said pot body including:
an electrolyzing vessel, said vessel having support areas for supporting a partition therein;
a removable hollow, porous partition member having a bottom with an aperture therein, and which is mountable on said support areas of said vessel for dividing said vessel into two chambers, said hollow porous partition member being insertable into said vessel through said opening and being mountable in said vessel in water proof relationship to said vessel at said support areas;
a hollow pillar protruding from the bottom of said vessel and extending upwards through said aperture in the bottom of said partition member;
a negative electrode in one of said chambers and a positive electrode in the other of said chambers;
means in communication with the positive electrode chamber for removing water from said positive electrode chamber after an electrolyzing operation;
a cover detachably mounted on said opening at the top of said pot body, said cover including a screw which is detachably screwed to the top of said pillar so as to fix said cover to said pillar, thereby fixedly covering said opening of said pot body; and
a nozzle in said pot body which is in communication with said negative electrode chamber.

27. A water pot with an electrolyzing device according to claim 26 wherein said screw of said cover includes means coupled to a source of electric current and means coupling said source to said positive electrode situated in said positive electrode chamber.

28. A water pot with an electrolyzing device according to claim 26 wherein said screw of said cover has a knob attached thereto to facilitate manual operation thereof.

29. A water pot with an electrolyzing device according to claim 26 wherein said means for removing water from said positive electrode chamber comprises a manually operable means.

30. A water pot with an electrolyzing device according to claim 26 wherein said nozzle is formed in said cover of said pot body.

31. A water pot with an electrolyzing device according to claim 26 wherein said nozzle is formed in said electrolyzing vessel.

* * * * *